US010898881B2

(12) United States Patent
Kaneda et al.

(10) Patent No.: US 10,898,881 B2
(45) Date of Patent: Jan. 26, 2021

(54) CATALYST FOR METAL MERCURY OXIDATION REACTIONS AND NITROGEN OXIDE REDUCTION REACTIONS, AND EXHAUST GAS PURIFICATION METHOD

(71) Applicant: MITSUBISHI HITACHI POWER SYSTEMS, LTD., Yokohama (JP)

(72) Inventors: Shinpei Kaneda, Yokohama (JP); Naomi Imada, Yokohama (JP); Yasuyoshi Kato, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 16/081,525

(22) PCT Filed: Mar. 1, 2017

(86) PCT No.: PCT/JP2017/008179
§ 371 (c)(1),
(2) Date: Aug. 31, 2018

(87) PCT Pub. No.: WO2017/150632
PCT Pub. Date: Sep. 8, 2017

(65) Prior Publication Data
US 2019/0015821 A1  Jan. 17, 2019

(30) Foreign Application Priority Data
Mar. 2, 2016 (JP) .................. 2016-040213

(51) Int. Cl.
*B01J 27/199* (2006.01)
*B01J 37/04* (2006.01)
*B01D 53/86* (2006.01)
*F01N 3/10* (2006.01)

(52) U.S. Cl.
CPC ............ *B01J 27/199* (2013.01); *B01D 53/86* (2013.01); *B01D 53/8628* (2013.01); *B01D 53/8665* (2013.01); *B01J 37/04* (2013.01); *F01N 3/10* (2013.01); *B01D 2255/2045* (2013.01); *B01D 2255/20707* (2013.01); *B01D 2255/20723* (2013.01); *B01D 2255/20769* (2013.01); *B01D 2255/20776* (2013.01); *B01D 2255/70* (2013.01); *B01D 2257/302* (2013.01); *B01D 2257/402* (2013.01); *B01D 2257/404* (2013.01); *B01D 2257/602* (2013.01); *B01J 2523/23* (2013.01); *B01J 2523/47* (2013.01); *B01J 2523/55* (2013.01); *B01J 2523/68* (2013.01); *B01J 2523/69* (2013.01)

(58) Field of Classification Search
CPC . B01J 21/063; B01J 23/22; B01J 23/26; B01J 23/28; B01J 27/053; B01J 27/16; B01J 37/04; B01J 2523/23; B01J 2523/47; B01J 2523/55; B01J 2523/68; B01J 2523/69; B01D 53/86; B01D 53/8609; B01D 53/8628; B01D 53/8637; B01D 2257/302; B01D 2257/402; B01D 2257/404; B01D 2257/602

USPC ........ 502/209, 211, 309, 312, 350; 423/107, 423/213.2, 235, 244.01, 244.06, 244.07, 423/594.18; 106/772
See application file for complete search history.

(56) References Cited

U.S. PATENT DOCUMENTS

| 3,215,644 | A | * | 11/1965 | Kakinoki | ................. B01J 23/22 502/218 |
| 4,966,873 | A | | 10/1990 | Iida et al. | |
| 5,869,419 | A | * | 2/1999 | Obayashi | ........... B01D 53/8628 423/239.1 |
| 6,110,860 | A | * | 8/2000 | Inoue | ................... B01D 53/945 502/217 |
| 6,696,386 | B2 | * | 2/2004 | Inoue | ................... B01D 53/944 502/218 |
| 7,928,033 | B2 | * | 4/2011 | Akiyama | ............... G01N 21/33 423/107 |
| 8,535,628 | B2 | * | 9/2013 | Kato | ..................... B01J 27/199 423/212 |
| 2010/0183492 | A1 | | 7/2010 | Kato et al. | |
| 2010/0210455 | A1 | * | 8/2010 | Nochi | ................ B01D 53/8628 502/209 |
| 2011/0165043 | A1 | | 7/2011 | Kato | |

(Continued)

FOREIGN PATENT DOCUMENTS

| JP | 1-148345 A | 6/1989 |
| JP | 2-184342 A | 7/1990 |

(Continued)

OTHER PUBLICATIONS

International Search Report dated Jun. 6, 2017, issued in counterpart International Application No. PCT/JP2017/008179 (2 pages).

(Continued)

*Primary Examiner* — Patricia L. Hailey
(74) *Attorney, Agent, or Firm* — Westerman, Hattori, Daniels & Adrian, LLP

(57) ABSTRACT

A catalyst for oxidation reaction of metallic mercury and reduction reaction of nitrogen oxide, comprising an oxide of titanium, an oxide of molybdenum, an oxide of vanadium, an oxide of phosphorus and gypsum is obtained by kneading titanium dioxide, ammonium molybdate, ammonium metavanadate, phosphoric acid, gypsum dihydrate and water using a kneader to obtain a paste, applying the paste to a metal lath substrate, and then drying and calcining the resultant.

6 Claims, No Drawings

(56) References Cited

U.S. PATENT DOCUMENTS

2011/0250114 A1* 10/2011 Augustine .......... B01D 53/8628
                                                                               423/239.1
2013/0129590 A1     5/2013   Kato et al.
2018/0280943 A1* 10/2018   Alcove Clave .... B01D 53/1431

FOREIGN PATENT DOCUMENTS

| JP | 02184342 A | * | 7/1990 | ............ B01J 27/053 |
| --- | --- | --- | --- | --- |
| JP | 05000244 A | * | 1/1993 | ............ B01J 27/053 |
| JP | 2005-125211 A | | 5/2005 | |
| JP | 2010-29782 A | | 2/2010 | |
| JP | 2011-78898 A | | 4/2011 | |
| JP | 2012-11317 A | | 1/2012 | |
| JP | 2013-116428 A | | 6/2013 | |
| KR | 20120000980 A | | 1/2012 | |
| WO | 2009/031234 A1 | | 3/2009 | |

OTHER PUBLICATIONS

Extended European Search Report dated Oct. 16, 2019, issued in counterpart EP Application No. 17760096.2. (7 pages).

* cited by examiner

CATALYST FOR METAL MERCURY OXIDATION REACTIONS AND NITROGEN OXIDE REDUCTION REACTIONS, AND EXHAUST GAS PURIFICATION METHOD

TECHNICAL FIELD

The present invention relates to a catalyst for oxidation reaction of metallic mercury and reduction reaction of nitrogen oxide, and a method for exhaust gas purification. More specifically, the present invention relates to a catalyst that is capable of accelerating gas phase oxidation reaction of metallic mercury and gas phase reduction reaction of nitrogen oxide, and is also capable of suppressing gas phase oxidation reaction of sulfur dioxide, as well as a method for purifying exhaust gas, which comprises oxidizing metallic mercury and reducing nitrogen oxide.

BACKGROUND ART

There is concern that metallic mercury contained in flue gas discharged from power stations, factories, automobiles and the like affects the environment. Hence, removal of metallic mercury in flue gas to suppress the release thereof into the atmosphere has been required. For example, Patent Document 1 discloses a system for treatment of mercury in exhaust gas, comprising a means for feeding an ammonium chloride solution into a gas duct for discharging exhaust gas from a boiler, NOx reduction and removal equipment having a denitration catalyst for reducing nitrogen oxide in exhaust gas using ammonia, and oxidizing mercury in the presence of hydrogen chloride, wet desulfurization equipment for removing mercury oxidized in the NOx reduction and removal equipment using an alkaline absorption solution, and a finishing mercury-removing apparatus for removing mercury remaining in the exhaust gas, the apparatus is installed inside or downstream of the wet desulfurization equipment.

Various denitration catalysts capable of oxidizing mercury have been proposed. For example, Patent Document 2 discloses an exhaust gas treatment method for treatment of exhaust gas containing nitrogen oxide and metallic mercury, comprising carrying out a reaction for converting metallic mercury into mercury halide in the presence of a halogen compound and treatment of nitrogen oxide using a catalyst comprising two- or three-component complex oxide composed of titanium, and one or two selected from the group consisting of silicon, zirconium, aluminum, tungsten and molybdenum.

Patent Document 3 discloses a catalyst for purification of exhaust gas, which is a composition composed of each oxide of (i) titanium, (ii) molybdenum and/or tungsten, (iii) vanadium and (iv) phosphorus, wherein an atomic ratio of (i)/(ii)/(iii) is 85-97.5/2-10/0.5-10, and an atomic ratio of (iv)/((ii)+(iii)) is 0.5 to 1.5.

Meanwhile, a denitration catalyst containing gypsum has been known. For example, Patent Document 4 discloses a method for producing a denitration catalyst, comprising: mixing gypsum dehydrate with a paste material comprising water, titanium oxide or its precursor and a soluble salts containing at least one catalytic element selected from the group consisting of tungsten (W), vanadium (V), molybdenum (Mo), aluminum (Al) and gallium (Ga) to obtain a paste product; applying the paste product to a reticulated structure made of metallic or inorganic fiber; and drying and calcining the resultant.

Patent Document 5 discloses a denitration catalyst produced by mixing a first component comprising titanium oxide and an active ingredient containing at least vanadium supported on the titanium oxide, a second component comprising silica, a titanium oxide or alumina having a specific surface area lower than that of the first composition and no vanadium, and a third component comprising gypsum in such a manner that a weight ratio of the third component relative to the total weight of the first component, the second component and the third component is greater than 1% by weight and not more than 20% by weight, and performing shape forming, drying and then calcining of the mixture.

The denitration catalyst containing gypsum as described in Patent Document 4 or 5 is used for purification of mercury-free exhaust gas.

CITATION LIST

Patent Literatures

Patent Document 1: JP 2012-11317 A
Patent Document 2: JP 2005-125211 A
Patent Document 3: WO 2009/031234 A1
Patent Document 4: JP 2011-78898 A
Patent Document 5: JP 2013-116428 A

SUMMARY OF THE INVENTION

Problems to be Solved by the Invention

An object of the present invention is to provide a catalyst capable of accelerating gas phase oxidation reaction of metallic mercury and gas phase reduction reaction of nitrogen oxide, and suppressing gas phase oxidation reaction of sulfur dioxide, as well as a method for purifying exhaust gas, comprising oxidizing metallic mercury and reducing nitrogen oxide.

Means for Solving the Problems

As a result of intensive studies to achieve the above object, the present invention encompassing the following embodiments has been completed.

[1] A catalyst for oxidation reaction of metallic mercury and reduction reaction of nitrogen oxide, comprising an oxide of titanium, an oxide of molybdenum and/or tungsten, an oxide of vanadium, an oxide of phosphorus, and gypsum.

[2] The catalyst according to [1], wherein a ratio of the dry-based mass of gypsum dihydrate to the mass of the oxide of titanium is 1/99 to 40/60.

[3] A method for purifying exhaust gas, comprising bringing an exhaust gas containing metallic mercury, nitrogen oxide and sulfur dioxide in contact with a catalyst comprising an oxide of titanium, an oxide of molybdenum and/or tungsten, an oxide of vanadium, an oxide of phosphorus, and gypsum to oxidize the metallic mercury and reduce the nitrogen oxide.

Advantageous Effects of the Invention

The catalyst of the present invention is capable of accelerating gas phase oxidation reaction of metallic mercury and gas phase reduction reaction of nitrogen oxide, and is also capable of suppressing gas phase oxidation reaction of sulfur dioxide.

The method for purifying exhaust gas of the present invention comprises bringing an exhaust gas containing metallic mercury, nitrogen oxide and sulfur dioxide in contact with the catalyst of the present invention, so as to oxidize metallic mercury and reduce nitrogen oxide, but to oxidize sulfur dioxide with difficulty.

The functions of the catalyst of the present invention on the gas phase oxidation reaction of metallic mercury, on the gas phase reduction reaction of nitrogen oxide, and on the gas phase oxidation reaction of sulfur dioxide are unknown, but are assumed to result from gypsum (e.g., gypsum dihydrate), which has been added as a catalyst raw material, dehydrated in a calcination process to have a porous structure.

EMBODIMENTS FOR CARRYING OUT THE INVENTION

The catalyst of the present invention comprises an oxide of titanium, an oxide of molybdenum and/or tungsten, an oxide of vanadium, an oxide of phosphorus, and gypsum. The catalyst of the present invention is used for acceleration of the oxidizing reaction of metallic mercury and the reduction reaction of nitrogen oxide.

The catalyst of the present invention is not particularly limited by the production method, and can be produced by, for example, mixing compounds used as raw materials for components constituting the catalyst with water, so as to obtain a paste, shape forming or applying the paste to a substrate, and then drying and calcining the resultant.

Examples of raw materials for an oxide of titanium can include: titanium dioxide ($TiO_2$) powder, slurry or paste; orthotitanic acid or metatitanic acid ($H_2TiO_3$) powder, slurry or paste and the like. The titanium dioxide that is suitably used as a raw material for an oxide of titanium has a specific surface area of preferably not less than 20 $m^2/g$, and more preferably 40 $m^2/g$ to 300 $m^2/g$. The titanium dioxide is preferably the anatase type. Moreover, the titanium dioxide powder has a 50% diameter of preferably 0.001 µm to 0.1 µm in a number-based particle size distribution as determined by electron microscopic observation.

Examples of raw materials for an oxide of molybdenum and/or tungsten can include oxides, oxoacids or salts of these elements. More specific examples thereof can include: Mo-containing compounds such as molybdenum trioxide, molybdic acid, ammonium molybdate and the like; and W-containing compounds such as tungstic trioxide, tungstic acid, ammonium metatungstate and the like. The total amount of a molybdenum element and a tungsten element contained in the catalyst of the present invention is preferably 1.5 to 13 moles, and more preferably 2 to 12 moles with respect to 100 moles of the titanium element.

Examples of raw materials for an oxide of vanadium can include an oxide of vanadium, and oxoacids or salts thereof. More specific examples thereof can include V-containing compounds such as ammonium metavanadate, vanadyl sulfate and the like. The amount of a vanadium element contained in the catalyst of the present invention is preferably 0.1 to 13 moles, and more preferably 0.5 to 12 moles with respect to the mass, 100 moles of the titanium element.

Examples of raw materials for an oxide of phosphorus can include orthophosphoric acid, diphosphoric acid, triphosphoric acid, polyphosphoric acid, ammonium phosphate salt and the like. The amount of a phosphorus element contained in the catalyst of the present invention is preferably 50 to 150 moles, and more preferably 70 to 120 moles with respect to the total amount, 100 moles, of a molybdenum element, a tungsten element and a vanadium element.

Examples of raw materials for gypsum include anhydrous gypsum ($CaSO_4$), basanite ($CaSO_4 \cdot \frac{1}{2}H_2O$), and gypsum dihydrate ($CaSO_4 2H_2O$). Note that gypsum dihydrate is said to be converted at calcination temperatures described later to anhydrides such as hexagonal (type III) anhydride or orthorhombic (type II) anhydride.

Gypsum dihydrate that is preferably used for preparation of the catalyst is in the form of powder, for example. The mean particle diameter of the gypsum dihydrate powder is preferably not less than 15 µm, and preferably 15 to 100 µm. Note that the mean particle diameter of gypsum dihydrate is 50% diameter in the volume-based particle size distribution as measured by a laser diffraction method. The use of gypsum dihydrate powder having a mean particle diameter of less than 15 µm tends to result in the decreased pore volume of the catalyst. Furthermore, the specific surface area of the gypsum dihydrate powder is preferably 1 to 150 $m^2/g$, and more preferably 2 to 100 $m^2/g$.

The gypsum dihydrate may be any of natural gypsum dihydrate, chemical gypsum generated as a chemical industrial by-product, denitrified gypsum, and gypsum obtained from waste gypsum board, for example.

The amount of gypsum contained in the catalyst is in terms of dry-based mass of gypsum dihydrate, preferably 1/99 to 40/60, more preferably 3/97 to 35/65, and further preferably 5/95 to 30/70 with respect to the mass of the oxide of titanium. A low amount of gypsum tends to lead to a decreased proportion of macropores famed. Conversely, a large amount of gypsum tends to lead to the decreased abrasion strength of the catalyst.

Gypsum to be used for the catalyst of the present invention preferably contains an Fe element. The content of the Fe element is not particularly limited, and is preferably more than 0 mole and not more than 5 moles, and is more preferably more than 0 mole and not more than 4 moles with respect to 100 moles of a titanium element. It is assumed that an Fe element contained in gypsum is converted to iron sulfate during the production process. Gypsum to be used in the present invention preferably contains: no alkali metal element such as sodium, potassium and the like; no alkaline earth metal element other than calcium; and no phosphorus and no arsenic.

For the catalyst of the present invention, an Al-containing compound such as aluminum sulfate can be used. Al-containing compound can be expected to have an effect of enhancing the durability of the catalyst. Examples of the Al-containing compound can include aluminum sulfate and the like.

Furthermore, in preparation of the catalyst, inorganic particles such as colloidal silica, silica sol and the like, binders such as cellulose ester, polyvinyl alcohol and the like, or inorganic fibers such as glass fiber can be used. Inorganic fine particles, binders or inorganic fibers can be expected to have effects of enhancing the catalyst's strength and the strength for binding with a substrate and the like.

Paste can be obtained by wet-kneading the above raw materials, and inorganic fine particles, binders and/or inorganic fibers to be used as necessary together with water. Kneading can be performed using a known kneading means such as an extruder, a kneader, a planetary mixer and the like. Through this wet-kneading step, an oxide of titanium and gypsum are mixed in such a manner that appropriate spaces between them are maintained, and thus a catalyst having well-balanced abrasion strength and catalytic performance can be produced.

Subsequently, the above paste is shape formed. Shape forming can be carried out using an extruder, a roll forming machinery, or the like. Examples of shapes to be formed can include honeycomb, columnar, cylindrical, plate, corrugated shapes and the like. Moreover, upon shape forming, a substrate for carrying the paste can be used. Examples of the substrate can include: metal substrates such as metal lath, punching metal, wire net, metal cloth and the like; ceramic substrates such as ceramic cloth, ceramic mesh and the like; and glass substrates such as glass fiber cloth and the like.

After shape forming, the shaped product can be cut into a size as desired, or brought into a desired shape. For example, after the paste is formed into a plate, the plate can be processed by cutting, bending, punching or the like. Moreover, wavy elongated projections are formed, so that spacer parts can also be provided.

The thus obtained shaped object can then be dried and then calcined. Drying can be performed, but are not limited depending on the method, by natural drying, hot air drying, infra-red drying or the like. Calcination can be carried out using a known calcining furnace such as a tunnel furnace. For example, the temperature for calcination is preferably 400 to 600° C. Calcination is generally carried out in the atmosphere.

The catalyst of the present invention can be used for purification of exhaust gas containing metallic mercury, nitrogen oxide and sulfur dioxide. Specifically, the catalyst of the present invention is set in denitration equipment that is installed downstream of a combustion apparatus such as a boiler, exhaust gas containing metallic mercury, nitrogen oxide and sulfur dioxide is brought into contact with the catalyst, and at the same time ammonia and hydrogen chloride or ammonium chloride, for example, are introduced, so that nitrogen oxide can be reduced and metallic mercury can be oxidized. In the denitration equipment in which the catalyst of the present invention is set, the oxidizing reaction of sulfur dioxide is suppressed and the concentration of sulfur trioxide in gas discharged from the denitration equipment is low, thereby preventing increased pressure loss due to precipitation of acidic ammonium sulfate in an apparatus installed downstream of the denitration equipment, preventing the corrosion of instruments, and preventing the discharge of blue smoke of $SO_3$ from the chimney.

Hereinafter, the effects of the present invention are described by reference to the specific examples.

Example 1

In a kneader, 1276 g of titanium oxide (Ishihara Sangyo Kaisha Ltd., specific surface area: 170 $m^2/g$), 82 g of ammonium molybdate, 21.7 g of ammonium metavanadate, 74 g of 85% phosphoric acid, 134 g of silica sol (Nissan Chemical Corporation, Trade name: OS sol), 477 g of gypsum dihydrate (Kishida Chemical Co., Ltd., specific surface area: 20 $m^2/g$, and water content: 19.7%), and 580 g of water were put and then kneaded for 120 minutes. While 200 g of silica-alumina ceramic fiber (Toshiba Fine Flex K.K.) was gradually added to the mixture, the mixture was kneaded for 20 minutes to obtain a homogeneous paste. The resulting paste was placed on a metal lath substrate with a thickness of 0.7 mm obtained by lath machining of an SUS430J1L steel plate with a thickness of 0.2 mm, sandwiched between two polyethylene sheets and then caused to pass through a pair of pressure rollers, thereby filling meshes of the metal lath substrate and coating the same with the paste. The product was air-dried and calcined at 500° C. for 2 hours to obtain a catalyst 1. In the catalyst 1, an atomic ratio of Ti/Mo/V was 96/3/1, and a ratio of the dry-based mass of gypsum dihydrate to the mass of the oxide of titanium was 23/77. Mass of oxide of titanium=1276/(1276+477×(1-19.7/100)=0.77; Dry-based mass of gypsum dihydrate=477×(1-19.7/100)/(1276+477×(1-19.7/100)=0.23.

Example 2

A catalyst 2 was obtained by the same manner as in Example 1 except that the amount of gypsum dihydrate was 318 g instead of 477 g. In the catalyst 2, an atomic ratio of Ti/Mo/V was 96/3/1, and a ratio of the dry-based mass of gypsum dihydrate to the mass of the oxide of titanium was 17/83.

Example 3

A catalyst 3 was obtained by the same manner as in Example 1 except that the amount of gypsum dihydrate was 75 g instead of 477 g. In the catalyst 3, an atomic ratio of Ti/Mo/V was 96/3/1, and a ratio of the dry-based mass of gypsum dihydrate to the mass of the oxide of titanium was 4/96.

Comparative Example 1

A catalyst 4 was obtained by the same manner as in Example 1 except that fused silica (Tatsumori Ltd., Trade name: Fuselex E-2, specific surface area: 2 $m^2/g$, and water content: 0.0%) was used instead of gypsum dihydrate. In the catalyst 4, an atomic ratio of Ti/Mo/V was 96/3/1, and a ratio of the mass of fused silica to the mass of the oxide of titanium was 23/77.

Comparative Example 2

A catalyst 5 was obtained by the same manner as in Example 1 except that particulate silica (Tomita Pharmaceutical Co., Ltd., Trade name: Mycon F, specific surface area: 120 $m^2/g$, water content: 5.0%) was used instead of gypsum dihydrate. In the catalyst 5, an atomic ratio of Ti/Mo/V was 96/3/1, and a ratio of the mass of dry-based particulate silica to the mass of the oxide of titanium was 23/77.

Comparative Example 3

A catalyst 6 was obtained by the same manner as in Example 1 except that the amount of gypsum dihydrate was 0 g. In the catalyst 6, an atomic ratio of Ti/Mo/V was 96/3/1.

Comparative Example 4

A catalyst 7 was obtained by the same manner as in Example 1 except that the amount of 85% phosphoric acid was 0 g. In the catalyst 7, an atomic ratio of Ti/Mo/V was 96/3/1, and a ratio of the dry-based mass of gypsum dihydrate to the mass of the oxide of titanium was 23/77.

Evaluation Test

Catalyst pieces each having a width of 20 mm×a length of 100 mm were cut out of the catalysts 1 to 7, respectively.

A tubular reactor was loaded with catalyst pieces. Under the conditions shown in Table 1, simulant exhaust gas was fed to the tubular reactor, and then Hg oxidation ratio was determined. The Hg oxidation ratio was obtained by absorbing mercury vapor in an oxidized state using a phosphate buffer, and then analyzing the metallic mercury by a method as per JIS K-0222.

A tubular reactor was loaded with catalyst piece. Under the conditions shown in Table 2, simulant exhaust gas was fed to the tubular reactor, and then denitration ratio was determined. The denitration ratio was calculated from measurements of concentration at an inlet and an outlet of the tubular reactor using a chemiluminescent NOx analyzer system.

A tubular reactor was loaded with three catalyst pieces. Under the conditions shown in Table 3, simulant exhaust gas was fed to the tubular reactor, and then $SO_2$ oxidation ratio was determined. The $SO_2$ oxidation ratio was calculated from measurements of concentration at an inlet and an outlet of the tubular reactor using an infrared $SO_2$ meter.

TABLE 1

| 1. Gas composition | |
|---|---|
| $O_2$ | 3% |
| $H_2O$ | 12% |
| $NH_3$ | 360 ppm |
| NOx | 300 ppm |
| HCl | 30 ppm |
| Hg | 80 ng/L |
| $N_2$ | remainder |
| 2. Gas flow rate | 3.1 l/min |
| 3. Temp. | 380° C. |
| 4. Catalyst amount | Three Catalyst pieces, width 20 mm × length 100 mm |

TABLE 2

| 1. Gas composition | |
|---|---|
| NOx | 200 ppm |
| $NH_3$ | 240 ppm |
| $SO_2$ | 500 ppm |
| $O_2$ | 3% |
| $CO_2$ | 12% |
| $H_2O$ | 12% |
| $N_2$ | remainder |
| 2. Gas flow rate | 3.1 l/min |
| 3. Temp. | 400° C. |
| 4. Catalyst amount | One Catalyst piece, width 20 mm × length 100 mm |

TABLE 3

| Item | Value |
|---|---|
| 1. Gas composition | |
| $SO_2$ | 500 ppm |
| $O_2$ | 3% |
| $H_2O$ | 3% |
| $N_2$ | remainder |
| 2. Gas flow rate | 3.1 l/min |
| 3. Temp. | 380° C. |
| 4. Catalyst amount | Three Catalyst pieces, width 20 mm × length 100 mm |

TABLE 4

| | Catalyst | | Ratio of dry-based mass of gypsum dihydrate or silica to mass of oxide of titanium | Catalytic performance (%) | | |
|---|---|---|---|---|---|---|
| | | | | Hg oxidation ratio | Denitration ratio | $SO_2$ oxidation ratio |
| Ex. 1 | Ti/Mo/V/P | Gypsum dihydrate | 23/77 | 55 | 65 | 0.7 |
| Ex. 2 | Ti/Mo/V/P | Gypsum dihydrate | 17/83 | 53 | 64 | 0.8 |
| Ex. 3 | Ti/Mo/V/P | Gypsum dihydrate | 4/96 | 50 | 64 | 0.9 |
| Comp. Ex. 1 | Ti/Mo/V/P | Fused silica | 23/77 | 50 | 57 | 0.7 |
| Comp. Ex. 2 | Ti/Mo/V/P | Particulate silica | 23/77 | 37 | 57 | 0.6 |
| Comp. Ex. 3 | Ti/Mo/V/P | — | 0/100 | 48 | 63 | 1.0 |
| Comp. Ex. 4 | Ti/Mo/V | Gypsum dihydrate | 23/77 | 55 | 68 | 1.2 |

The gypsum-free catalyst 6 (Comparative example 3) corresponding to the catalyst disclosed in Patent Document 3 had a high denitration ratio, but a slightly low Hg oxidation ratio and a slightly high $SO_2$ oxidation ratio.

The catalyst 4 (Comparative example 1) containing fused silica that is a material with small specific surface area had low denitration ratio. The catalyst 5 (Comparative example 2) containing particulate silica that is a material with large specific surface area had low denitration ratio and low Hg oxidation ratio.

The phosphorus-free catalyst 7 (Comparative example 4) corresponding to the catalyst disclosed in Patent Document 4 had high Hg oxidation ratio and high denitration ratio, but had high $SO_2$ oxidation ratio.

By contrast, the catalysts of the present invention, 1 to 3 (Examples 1 to 3), containing gypsum, had Hg oxidation ratio of as high as not less than 50%, denitration ratio of as high as not less than 64%, and $SO_2$ oxidation ratio of as low as less than 1%.

As shown here, the catalysts of the present invention were excellent in balance of acceleration of gas phase oxidation reaction of metallic mercury and gas phase reduction reaction of nitrogen oxide and suppression of gas phase oxidation reaction of sulfur dioxide.

The invention claimed is:

1. A catalyst for oxidation reaction of metallic mercury and reduction reaction of nitrogen oxide, the catalyst comprising:
   an oxide of titanium,
   an oxide of molybdenum and/or tungsten,
   an oxide of vanadium,
   an oxide of phosphorus, and
   gypsum obtained by burning a gypsum dihydrate, wherein the amount of the gypsum contained in the catalyst is 1/99 to 40/60 in terms of dry based mass of the gypsum dihydrate with respect to the mass of the oxide of titanium.

2. A method for exhaust gas purification, comprising bringing an exhaust gas containing metallic mercury, nitrogen oxide and sulfur dioxide in contact with the catalyst according to claim 1 to accelerate oxidation reaction of metallic mercury and reduction reaction of nitrogen oxide and to suppress oxidation reaction of sulfur dioxide.

3. A catalyst for oxidation reaction of metallic mercury and reduction reaction of nitrogen oxide, the catalyst comprising:
   an oxide of titanium,
   an oxide of molybdenum and/or tungsten,
   an oxide of vanadium,
   an oxide of phosphorus, and
   gypsum,
   wherein the catalyst is obtained by burning an object comprising a raw material of an oxide of titanium, a raw material of an oxide of molybdenum and/or tungsten, a raw material of an oxide of vanadium, a raw material of an oxide of phosphorus and gypsum dihydrate to remove hydrated water contained in the gypsum dihydrate.

4. The catalyst described in claim 3, wherein the amount of the gypsum contained in the catalyst is 1/99 to 40/60 in terms of dry-based mass of the gypsum dihydrate with respect to the mass of the oxide of titanium.

5. The catalyst described in claim 3, wherein the total amount of a molybdenum element and a tungsten element contained in the catalyst is 1.5 to 13 moles with respect to 100 moles of a titanium element, the amount of a vanadium element contained in the catalyst is 0.1 to 13 moles with respect to 100 moles of the titanium element, and the amount of a phosphorus element contained in the catalyst is 50 to 150 moles with respect to the total amount, 100 moles, of the molybdenum element, the tungsten element and the vanadium element.

6. A method for exhaust gas purification, comprising bringing an exhaust gas containing metallic mercury, nitrogen oxide and sulfur dioxide in contact with the catalyst according to claim 3 to accelerate oxidation reaction of metallic mercury and reduction reaction of nitrogen oxide and to suppress oxidation reaction of sulfur dioxide.

* * * * *